United States Patent [19]
Tamii et al.

[11] 3,986,098
[45] Oct. 12, 1976

[54] POWER CONVERSION SYSTEM

[75] Inventors: Seizo Tamii; Muneaki Takeuchi, both of Amagasaki, Japan

[73] Assignee: Mitsubishi Denki Kabushiki Kaisha, Tokyo, Japan

[22] Filed: Nov. 6, 1974

[21] Appl. No.: 521,534

[30] Foreign Application Priority Data
Nov. 7, 1973 Japan.............................. 48-125701

[52] U.S. Cl................................ 321/45 R; 307/64; 307/66
[51] Int. Cl.² ....................................... H02M 7/515
[58] Field of Search............... 307/64, 66; 321/45 R

[56] References Cited
UNITED STATES PATENTS

| | | | |
|---|---|---|---|
| 3,017,559 | 1/1962 | Mallory............................ | 321/45 R |
| 3,044,023 | 7/1962 | Floyd .............................. | 321/45 R |
| 3,293,445 | 12/1966 | Levy ............................... | 321/45 R X |
| 3,339,080 | 8/1967 | Howald............................ | 321/45 R |
| 3,434,034 | 3/1969 | Garber et al...................... | 321/47 X |
| 3,820,006 | 6/1974 | Phillips............................ | 321/45 R |

FOREIGN PATENTS OR APPLICATIONS

| | | | |
|---|---|---|---|
| 44-2642 | 8/1965 | Japan................................... | 307/66 |
| 1,127,909 | 9/1968 | United Kingdom................... | 307/66 |

*Primary Examiner*—William M. Shoop
*Attorney, Agent, or Firm*—Wenderoth, Lind & Ponack

[57] ABSTRACT

A combined converter and inverter circuit is disclosed. A transformer has a primary winding connected across a DC source through two parallel switching thyristors with respective diodes and a secondary winding connected across two AC terminals through a filter. Two series thyristors with diodes are connected across the primary winding to be able to form closed current loops. In the DC-to-AC conversion the switching thyristors invert DC power to produce AC power including a reactive component flowing through the closed loop. In the AC-to-DC conversion the closed current loop causes the storage of electric power on the filter and the diodes across the switching thyristors rectify the stored power for charging the DC source.

14 Claims, 15 Drawing Figures

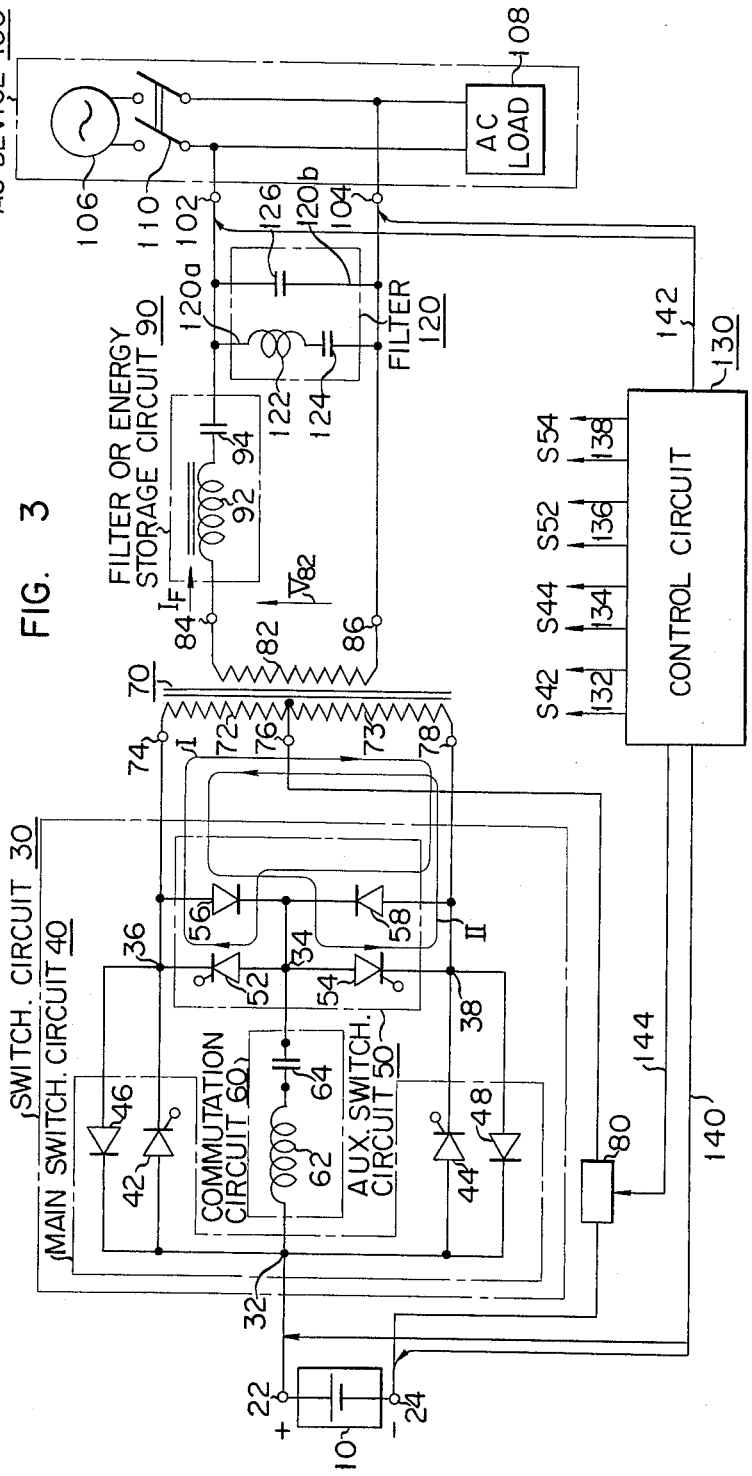

POWER CONVERSION SYSTEM

BACKGROUND OF THE INVENTION

This invention relates to a power conversion system for converting electric power from alternating current to the form of direct current and vice versa.

There have been proposed numerous types of converters for converting alternating current (AC) power to direct current (DC) power as well as numerous types of inverters for converting DC power to AC power. Representative examples of the converter involve rectifier devices.

In some electric apparatus, for example, uninterruptible power supplies or standby power supplies, it is required to perform the operation of converting AC power to DC power as well as the operation of converting DC power to AC power. Conventional electric apparatus having both the function of converting AC power to DC power and the function of converting DC power to AC power have generally included both a converter for converting AC power to DC power and an inverter for converting DC power to AC power. Converters are generally equal to or higher than inverters in cost. Thus the use of two conversion devices (a converter and an inverter) has resulted in electrical which is expensive and large-sized.

In order to avoid these objections, it has been already proposed to selectively use a single conversion device as a converter and an inverter by changing the electrical connection of the device between the AC-to-DC and DC-to-AC conversion modes of operation. This method is effective for electric apparatus having the time period during which they are operated in the AC-to-DC conversion mode, not overlapping the time period during which they are operated in the DC-to-AC conversion mode. The uninterruptible and standby power supplies as above described are just such an electric apparatus. In such electric apparatus the selective use of a single conversion device as a converter and an inverter can reduce the size thereof while nearly halving the cost. However, since the electrical power connection should be changed between the AC-to-DC and DC-to-AC conversion mode of operation, time has been required until the AC-to-DC conversion mode is switched to the DC-to-AC conversion mode of operation and vice versa. This has led to power breakdown in uninterruptible power sources during that switching time. In addition, the switching has required an additional control circuitry.

Accordingly it is an object of the present invention to provide a new and improved power conversion system operative in either of the AC-to-DC and DC-to-AC conversion modes with a single conversion device and without changing the electrical connection of the device.

SUMMARY OF THE INVENTION

According to the principles of the present invention there is provided a power conversion system comprising, in combination, power conversion circuit means including first terminal means, second terminal means, power conversion circuit means connected to the first terminal means and able to store electrical energy, and second circuit means connected to the second terminal means, the second circuit means including a switching element for repeatedly and alternately performing the ON and OFF operations and being able to form a closed current loop, means for applying AC power across the first terminal means, and means for applying DC power across the second terminal means, the power conversion circuit means responding to the application of the AC power across the first terminal means to alternately repeat a first time period during which the second circuit means forms the closed current loop therein to store electrical energy by the first circuit means and a second time period during which the closed circuit loop is broken to produce a DC voltage across the second terminal means in accordance with the electrical energy stored in the first circuit means, the power conversion circuit means responding to the application of the DC voltage across the second terminal means to repeatedly and alternately turn the switching element of the second circuit means on and off thereby to produce an AC voltage across the first terminal means.

In a preferred embodiment of the present invention the power conversion circuit means may include a transformer having a first winding connected to a filter circuit for storing the electrical energy during the first time period and a second winding having a first thyristor connected between one end thereof and the second terminal means, a second thyristor connected between the other end thereof and the second terminal means, and a third thyristor and a fourth thyristor interconnected in series circuit relationship across the second winding. The first and second thyristors are so poled that a current from the second terminal means flows into the second winding therethrough and the third thyristor is opposite in polarity to the fourth thyristor with each of the thyristors connected in anti-parallel circuit relationship across an individual semiconductor.

In another preferred embodiment of the present invention, the power conversion circuit means includes a transformer having a first winding serially connected to a filter circuit for storing the electrical energy during the first time period and a second winding having a first thyristor and a second thyristor connected between one end thereof and one terminal of the second terminal means and a third thyristor and a fourth thyristor connected between the other end of the second winding and the other terminal of the second terminal means with one semiconductor diode connected in anti-parallel circuit relationship across each of the thyristors, the arrangement being such that, with a DC voltage applied across the second terminal means, the conduction of the first and third thyristors causes a current to flow from the one to the other of the terminals of the second terminal means and the conduction of the second and fourth thyristors causes a current from the other to the one of the terminals of the second terminal means.

BRIEF DESCRIPTION OF THE DRAWINGS

The present invention will become more readily apparent from the following detailed description taken in conjunction with the accompanying drawings in which:

FIG. 3 is a wiring diagram of one form of a power conversion circuit used with the power conversion system of the present invention;

FIG. 6 is a graph illustrating waveforms of current and voltage developed in the arrangement of FIG. 3 operated in the AC-to-DC conversion mode;

FIG. 7 is a graph illustrating the relationship between a DC output voltage and a pause angle for the arrangement of FIG. 3 operated in the AC-to-DC conversion mode;

FIG. 8 is a graph similar to FIG. 6 but illustrating waveforms developed in the arrangement somewhat differently operated;

DESCRIPTION OF THE PREFERRED EMBODIMENTS

Figure 1:
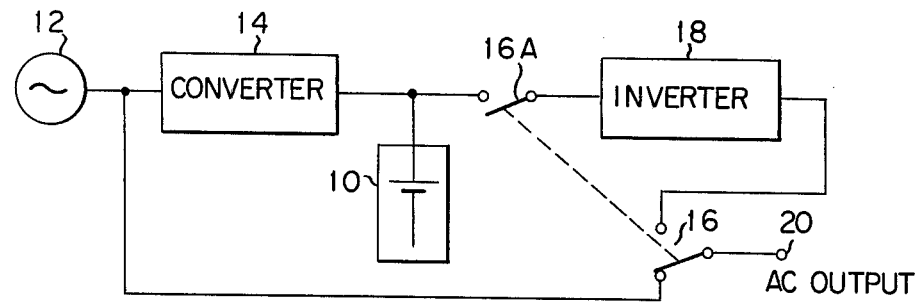
FIG. 1 is a block diagram of a standby power supply constructed in accordance with the principles of the prior art.

For a better understanding of the nature and operation of the present invention, conventional uninterruptible and standby sources of electric power will now be described in more detail. As above described, those conventional sources of electric power have included the converter and the inverter independent of each other. In a conventional standby source of electric power as shown in FIG. 1, a DC source 10 in this case, a battery is connected to an AC source 12 through a converter 14 and also to a switch 16A subsequently connected to an inverter 18. The AC source 12 may be normally a commercial source of alternating current. The inverter 18 is adapted to be connected to an AC output 20 through a transfer switch 16 interlocking with the switch 16A. In FIG. 1 the AC source 12 is also shown as being directly connected to AC output 20 through the transfer switch 16.

In the normal mode of operation the AC source 12 directly supplies AC power to the AC output 20 through the transfer switch 16 while at the same time the converter 14 supplied from the AC source 12 converts the AC power to DC power which, in turn, charges the battery 10. Upon the occurrence of a fault in the AC source 12, the transfer switch 16 switches to connect the inverter 18 to the AC output 20 and simultaneously the switch 16A is put in its closed position to connect the battery 10 to the inverter 18. Thus the inverter 18 is operated to convert DC power from the battery 10 to an AC power. This AC power is supplied to the AC output 20 through the switched transfer switch 16.

Figure 2:
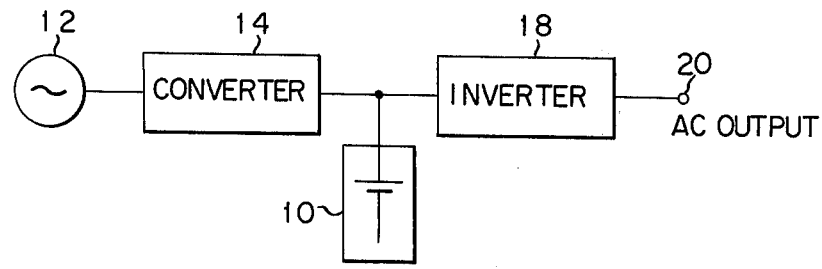
FIG. 2 is a block diagram of an uninterruptible power supply constructed in accordance with the principles of the prior art.

In FIG. 2 wherein like reference numerals disignate components identical to those shown in FIG. 1, there is illustrated an uninterruptible source of electric power identical in construction to the standby source shown in FIG. 1 except for the ommission of the switches 16 and 16A. The AC source 12 normally supplies AC power to the converter 14 where the AC power is converted to DC power. The converted DC power is accumulated or stored in the battery 10 and simultaneously supplied to the inverter 18 where it is converted back to AC power. This converted AC power is supplied to the AC output 20. If a fault occures in the AC source 12 then DC power from the battery 10 is supplied to the inverter 18 to be converted to AC power. The converted AC power is supplied to the AC output 20.

However conventional standby and uninterruptible power source such as shown in FIGS. 1 and 2 have been required to include a converter and inverter constructed independently of each other and which are expensive because the converter normally has a cost equal to or higher than that of the inverter. In order to reduce the cost of such power sources, the inverter might be modified to permit some components thereof to be used as parts of the converter and to use a transfer switch to change the connection therein whereby the inverter would be changed to the converter. This method has raised an objection in that due to a change in the connection an outage necessarily occurs during the transfer of the AC-to-DC conversion and vice versa.

The present invention seeks to eliminate the objection as above described by the provision of a power conversion system capable of operating an inverter involved as a converter without any special change in the electrical connection thereof.

Referring now to FIG. 3, there is illustrated a power conversion circuit used with a power conversion system constructed in accordance with the principles of the present invention. The arrangement illustrated comprises a DC electrical device 10 shown as being a battery connected across a pair of positive and negative terminals 22 and 24 respectively. The battery is adapted to be used selectively as a DC source in the DC-to-AC conversion mode of operation and as a DC load in the AC-to-DC conversion. The arrangement also comprises a switching circuit generally designated by the reference numeral 30 and including a main switching circuit, an auxiliary switching circuit and a commutation circuit generally designated by the reference numerals 40, 50 and 60 respectively. More specifically, the main switching circuit 40 includes a pair of main switching elements 42 and 44, in this case, thyristors having respective anode electrodes connected to the positive terminal 22 of the DC device 10 through the junction 32 thereof and a pair of semiconductor diodes 46 and 48 connected in anti-parallel circuit relationship across the associated thyristor 42 and 44 respectively.

The auxiliary switching circuit 50 includes a pair of auxiliary switching elements 52 and 54, in this case, thyristors having anode electrodes interconnected through a junction 34, and a pair of semiconductor diodes 56 and 58 connected in anti-parallel circuit relationship across the thyristors 52 and 54 respectively. The cathode electrode of the thyristor 52 and the anode electrode of the diode 56 are connected to a junction 36 to which the cathode electrode of the main thyristor 42 and the anode electrode of the diode 46 are also connected. Similarly, the cathode electrode of the thyristor 54 and the anode electrode of the diode 58 are connected to the junction 38 of the cathode electrode of the main thyristor 48 and the anode electrode of the diode 48.

The commutation circuit 60 is connected across the junctions 32 and 34 and includes a commutation reactor 62 and a commutation capacitor 64 serially interconnected. That terminal of the capacitor 64 near to the junction 32 is called an "a terminal" while the opposite terminal thereof is called a "b terminal" hereinafter.

The switching elements 42, 44, 52 and 54 may be formed of any suitable transistors other than the thyristors. Also each anti-parallel combination of the thyristor and diode may be replaced by one reverse conducting thyristor.

As shown in FIG. 3, the switching circuit 30 is connected to a transformer generally designated by the reference numeral 70. More specifically, the transformer 70 includes a pair of primary windings 72 and 73 serially interconnected and having end terminals 74 and 78 connected to the junctions 36 and 38 respectively and an center tap 76 connected to the negative terminal 24 of the DC device 24 through a current sensing impedance element 80. The transformer 70 also includes a single secondary winding 82 having a pair of terminals 84 and 86.

The terminal 84 of the secondary transformer winding 82 is connected to a filter circuit or an energy storage circuit generally designated by the reference numeral 90 and including a reactor 92 serially connected to a capacitor 94. Then the capacitor 94 is connected to an AC device generally designated by the reference numeral 100 at one AC terminal 102. The terminal 86 of the secondary transformer winding 82 is directly connected to the other AC terminal 104 of the AC device 100.

The AC device 100 includes a commercial AC source 63 connected across an AC load 108 through a switch 110.

As shown in FIG. 3, another filter circuit generally designated by the reference numeral 120 is connected across the AC terminals 102 and 104 of the AC device 100. The filter circuit 120 includes a pair of parallel circuit branches 120a and 120b. The circuit branch 120a is formed of a reactor 122 serially connected to a capacitor 124 while the circuit branch 120b is formed of a capacitor 126 alone.

In order to control the switching elements or thyristors 42, 44, 52 and 54, the arrangement further comprises a control circuit generally designated by the reference numeral 130. The control circuit 130 includes four output portions 132, 134, 136 and 138 through which control or trigger signals S42, S44, S52 and S54 are supplied to the switching elements or thyristors 42, 44, 52 and 54 respectively. It will readily be understood that, with the switching elements being thyristors, the respective output portions are connected across the gate and cathode electrodes of the associated thyristors although their connections are not shown in order to simplify the illustration.

The control circuit 130 has also connected thereto first, second and third detecting lines 140, 142 and 144 respectively. The first detecting line 140 is operative to detect a DC voltage across the DC terminals 22 and 24, the second detecting line 142 is operative to detect an AC voltage across the AC terminals 102 and 104, and the third line 144 serves to detect a direct current flowing through the impedance element 80 due to a voltage drop thereacross. Those detecting lines control the trigger signals from the control circuit 130 in response to the detected voltages or current.

Figure 4:
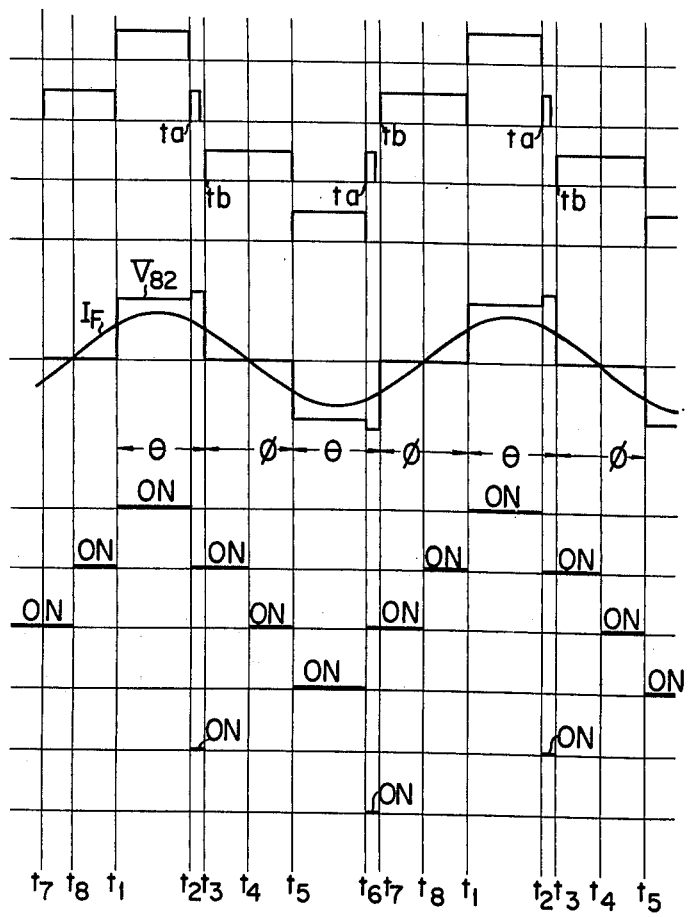
FIG. 4 is a graph useful in explaining the DC-to-AC conversion mode of operation of the arrangement shown in FIG. 3.

The operation of the arrangement as shown in FIG. 3 will now be described in terms of the DC-to-AC conversion mode with reference to FIG. 4. it is assumed that the switching elements 42, 44, 52 and 54 are thyristors. In FIG. 4, waveforms $(a)$, $(b)$, $(c)$ and $(d)$ show the control or trigger signals S42, S44, S52 and S54 applied to the thyristors 42, 44, 52 and 54 from the output portions 132, 134, 136 and 138 of the control circuit 130 respectively and having high levels sufficient to trigger the associated thyristors to their ON state. In FIG. 4$(e)$ there are shown a voltage $V_{82}$ across the secondary transformer winding 82 and a filtered current $I_F$ flowing through the filter circuit 90 due to that voltage $V_{82}$. The current $I_F$ is an output current in the DC-of-AC conversion mode to operation. The current $I_F$ is shown as having a sinusoidal waveform only for the purpose of facilitating the understanding of the operation of the present invention but actually it frequently has a complicated waveform. Also, in FIG. 4$(e)$ the reference character $\theta$ designates a conduction period or a conduction angle during or through which the thyristors 42 and 44 cooperate with the diodes 46 and 48 to permit a current to be conducted between the DC source 10 and the transformer 70, while the reference character $\phi$ designates a pause period equal to a time interval between each pair of adjacent conduction periods or a pause angle located between each pair of adjacent conduction angles.

In the DC-to-AC conversion mode of operation DC power from the DC source 10, for example a battery connected across the DC terminals 12 and 24 is converted to AC power which is, in turn, supplied to the AC load 108 connected across the AC terminals 102 and 104. This can occur for example, when the AC source 106 connected across the AC terminals 102 and 104 is disconnected from the AC load 108 by the switch 110 upon the occurrence of a fault in the AC source 106.

It is assumed that the commutation capacitor 64 is charged with a voltage equal to that across the DC source 10 and having a polarity such that the *a* terminal (see FIG. 3) is positive with respect to the *b* terminal at time point of $t_1$ shown in FIG. 4. This polarity is called hereinafter the "steady state polarity." If a control signal S42 assigned to the thyristor 42 rises to its high level at that time point $t_1$ then the thyristor 42 is turned on as shown in FIG. 4$(f)$. This turn-on of the thyristor 42 completes a closed circuit including DC source 10-terminal 22-junction 32-thyristor 42-junction 36-end terminal 74-primary winding 72-center tap 76-impedance element 80-terminal 24.

This causes the voltage across the DC source 10 to be applied across the primary winding 72. As a result, a voltage $V_{82}$ induced across the secondary winding 82 increases in magnitude with a predetermined polarity as shown in FIG. 4$(e)$. At the same time, the turn-on of the thyristor 42 permits the capacitor 64 to discharge through a closed circuit including capacitor 64-*a* terminal-reactor 62-junction 32-thyristor 42-junction 36-diode 56-junction 34-*b* terminal.

This discharge becomes oscillatory through the cooperation of the reactor 62 with the capacitor 64. As a result, the voltage across the capacitor 64 is inverted in polarity. That is, the voltage has such a polarity that the $b$ terminal is now positive with respect to the $a$ terminal. This polarity is called hereinafter the "inverse polarity."

At time point of $t_2$, the control signal S42 for the thyristor 42 drops to its null level while at the same time a control signal S52 assigned to the auxiliary thyristor 52 rises to its high level (see waveform ($b$), FIG. 4). This similarly results in the turn-on of the thyristor 52 as shown in FIG. 4($g$). This turn-on of the thyristor 52 permits the capacitor 64 to discharge through a closed circuit including capacitor 64-$b$ terminal-thyristor 52-junction 36-diode 46 or thyristor 42-junction 32-reactor 64-$a$ terminal.

If this discharge current is higher than the forward current flowing at the time through the thyristor 42 while the duration for which the discharge current is higher than the forward current exceeds the turn-off time as determined by the thyristor 42, then the thyristor 42 is turned off. However it is noted that, after the thyristor 42 has been turned off, the diode 46 has discharge current flowing therethrough from the anode to the cathode electrode thereof. Thus the diode 46 is in its ON state as shown in FIG. 4($j$). Therefore the current from the DC source 10 continues to flow through the primary winding 72 until it terminates at time point of $t_3$ as shown in FIG. 4. The capacitor 64 is again charged with the steady state polarity due to the discharge as above described. At time point of $t_3$ at which the diode 46 has been turned off, the voltage $V_{82}$ across the secondary winding 82 drops to its null level whereupon a conduction period $\theta$ starting at time point of $t_1$ is completed. That is, the conduction period $\theta$ is equal to a time interval between time points $t_1$ and $t_3$.

During that conduction period $\theta$ a current $I_F$ as shown in FIG. 4($e$) flows through the secondary transformer winding 82 while a corresponding primary current flows through a current path including DC source 10-terminal 22-junction 32-thyristor 42 or diode 46-junction 36-end terminal 74-primary winding 72-center tap 76-impedance element 80-terminal 24 for the time interval ($t_1 - t_3$) or between time points $t_1$ and $t_3$. While the conduction period $\theta$ is completed at the time point of $t_3$ the thyristor 52 remains in its ON state to form a first closed current loop I traced from the junction 34, through the thyristor 52, the junction 36, the end terminal 74, the primary windings 72 and 73, the end terminal 78 and the diode 58 and thence back to the junction 34. Because a load circuit on the secondary side of the transformer 70 includes reactance components, the current $I_F$ continues to flow through that load circuit during a time interval between time point of $t_3$ and time point of $t_4$ with the polarity remaining unchanged, while a corresponding primary current is flowing through the first current loop I as above described.

At time point $t_4$ the current $I_F$ is inverted in polarity but a control signal S54 for the thyristor 54 has already reached a high level sufficient to turn it on. This forms a second closed current loop II traced from the junction 34 through the thyristor 54, the junction 38, the end terminal 78, the primary windings 73, and 72, the end terminal 74 and the diode 54 and thence back to the junction 34. This second closed current loop II is substantially reversed in polarity from the first current loop I. Thus a primary current corresponding to the current $I_F$ inverted in polarity at and after the time point of $t_4$ can flow through the second closed current loop II. As shown in FIG. 4($h$), the thyristor 54 remains in its ON state until a time point of $t_5$.

The thyristors 52 and 54 may be supplied with the respective control signals S52 and S54 differently variable during a time interval ($t_2 - t_5$). For example, this thyristor 52 has a rise time point of $t_a$, in the case, coinciding with time point of $t_2$ at which the thyristor 42 is brought into its OFF state. This rise time point of $t_a$ may be varied by changing the time point of $t_2$ at which the conduction period $\theta$ is completed. It is, however, noted that a decay time point following the rise time point of $t_a$ is not significant. In other words, the control signal S52 may decay at any desired time point after time point of $t_2$ and before time point of $t_5$. This is because at the time point of $t_4$ when the current $I_F$ is inverted in polarity, the current $I_F$ automatically drops to its null level even though the control signal S52 would be at its high level. However the decay time point is normally selected to nearly coincide with time point of $t_3$.

The control signal S54 for the thyristor 54 may have a rise time point of $t_b$ selected to coincide with any desired time point between time points of $t_3$ and $t_4$ or within a time interval ($t_3 - t_4$). In FIG. 4, the rise time point of $t_b$ has been selected to substantially coincide with the time point of $t_3$. The control signal S54 for the thyristor 54 preferably has a decay time point coinciding with time point of $t_5$. This is because even if the waveform of load current is changed to approach the time point of $t_4$ for the polarity inversion to time point of $t_5$, the turn-on of the thyristor 54 is insured.

At time point of $t_5$ the control signal S54 for the thyristor 54 falls to its null level and instead a control signal S44 for the thyristor 44 rises to its high level. The operation of the arrangement as shown in FIG. 3 between time points of $t_5$ and $t_1$ is basically the same as that between the $t_1$ and $t_5$ as above described except for the following aspects: The thyristor 44 is put in its ON state during a time interval ($t_5 - t_6$) (see FIG. 4($i$) as is the diode 48 during a time interval ($t_6 - t_7$) (see FIG. 4($k$)). Also during a time interval ($t_6 - t_8$) the thyristor 54 is in its ON state to form the second current loop II as above described while during a time interval ($t_8 - t_1$) the thyristor 52 is in its ON state to form the first current loop I as above described. Further during a time interval ($t_5 - t_7$) a current from the DC source 10 flows on the primary side of the transformer 70 through a current path including terminal 22-junction 32-thyristor 44-junction 38-end terminal 78-primary winding 73-center tap 76-impedance element 80-terminal 24.

The current flows through the second closed current loop II as above described during a time interval ($t_7 - t_8$) and through the first closed current loop I as above described during a time interval ($t_8 - t_1$). The current $I_F$ is reversed in polarity at time point of $t_8$ the same as at time point of $t_4$.

During a time interval ($t_6 - t_1$) the control signal S52 for the thyristor 52 during the time interval ($t_2 - t_5$) is applied to the thyristor 54 and the control signal S54 for the thyristor 54 during the time interval ($t_2 - t_5$) is substituted for the control signal S52 for the thyristor 52.

From the foregoing it will be appreciated that, in the arrangement of FIG. 3 a rectangular voltage $V_{hd}$ 82 is produced which alternates in its conduction period $\theta$ with pause periods between conduction periods and that this voltage $V_{82}$ causes a flow of current $I_F$ even during the pause periods resulting in the stable operation of converting an DC power to an AC power.

The filter circuit 90 includes the reactor 92 and the capacitor 94 connected to form a series resonance circuit resonating at the frequency of the AC load 108 or the fundamental frequency of the commercial AC source 106. In the DC-to-AC conversion mode of operation the filter circuit 90 functions to derive the fundamental frequency component. The current $I_F$ as above described is a current filtered by the filter circuit 90 and has that fundamental frequency. Also, the detecting line 142 is operative to monitor the AC voltage across the AC terminal 102 and 104 while the detecting line 144 is operative to monitor the input current from the DC source 10 to control the control circuit 130 so as to make the detected AC voltage and input current equal to predetermined magnitudes.

Also from the foregoing it will be appreciated that the arrangement of FIG. 3 is characterized in that the switching elements in the main switching circuit 40 is intermittently put in their conducting state to provide a pause period between each pair of adjacent conducting states and also that the closed current loops are formed during each of the pause periods.

It has been found that the power conversion circuit of FIG. 3 having the characteristic features just described can effectively convert AC power to DC power with a very high efficiency. This very high efficiency is attributed to the production of DC power sufficiently high in magnitude with respect to a corresponding AC input power with the electrical connection of the power conversion circuit remaining basically unchanged.

Figure 5:
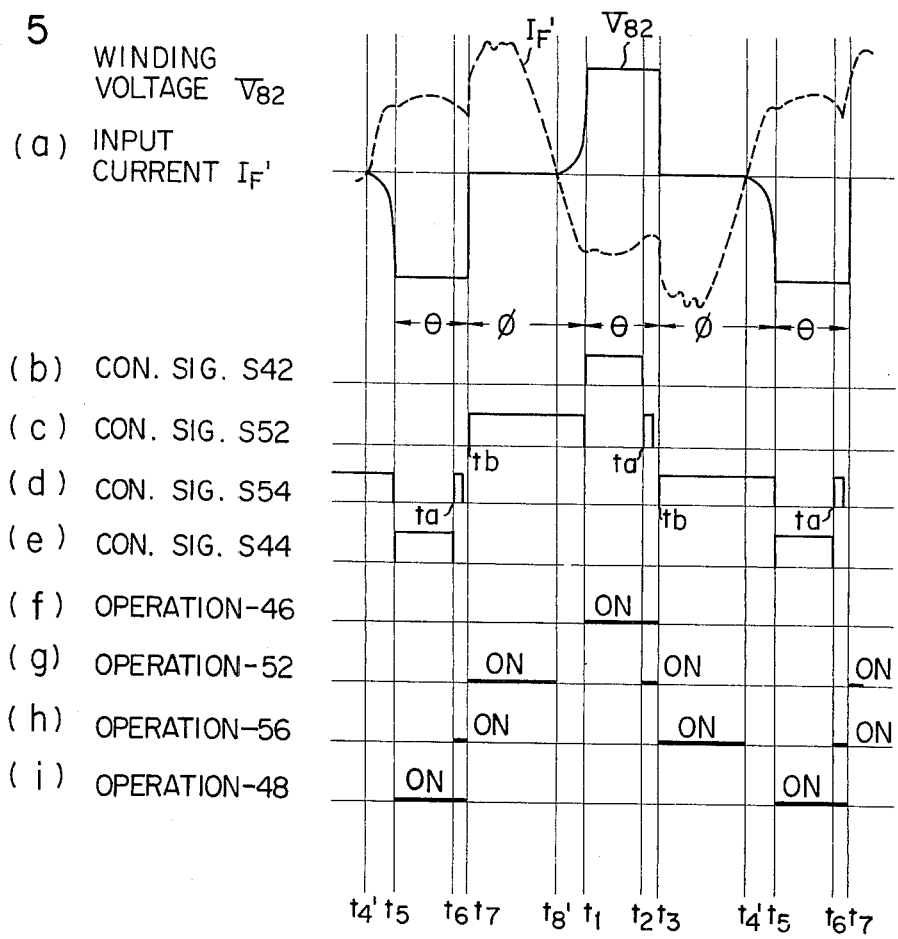
FIG. 5 is a graph useful in explaining the AC-to-DC conversion mode of operation of the arrangement shown in FIG. 3.

The arrangement of FIG. 3 will now be described in conjunction with the AC-to-DC conversion mode of operation and reference to FIGS. 5 and 6. For converting AC power to DC power, the switch 110 is first closed to connect the AC source 106 across the AC terminals 102 and 104. Also a DC load such as the battery 10 is connected across the DC terminals 22 and 24. The control signals for the switching elements 42, 44, 52 and 54, in this case, thyristors are inherently identical to those in the DC-to-AC conversion mode of operation. Also it is assumed that the filter circuit 90 serving as an energy storage circuit includes the reactor 92 having an inductance of 117 millihenrys and the capacitor 94 having a capacitance of 600 picofarads and that the AC terminals 102 and 104 are connected the across a commercial AC source having a frequency of 60 Hertz and an AC voltage of 100 volts, FIG. 5(a) and FIG. 6 show a current $I_F'$ flowing through the energy storage circuit 90 and the voltage $V_{82}$ across the secondary winding 82 of the transformer 70 under the assumed condition. Also FIG. 5(a) shows waveforms with a direct current of 10 amperes flowing through the impedance element 80 while FIG. 6 shows waveforms with a direct current of substantially null magnitude flowing through the impedance element 80.

The control signals S42, S44, S52 and S54 for the thyristors 42, 44, 52 and 54 have waveforms (b), (c), (d) and (e) as shown in FIG. 5 respectively and are essentially identical to corresponding waveforms (a), (b), (c) and (d) as shown in FIG. 4. FIG. 5(f) shows the ON and OFF states of the diode 40 relative to time, and FIGS. 5(g) and 5(h) show the ON and OFF states of the thyristors 52 and 54 relative to time, FIG. 5(i) shows the ON and OFF states of the diode 48 as does FIG. 4(k).

Further time points of $t_1$, $t_2$, $t_3$, $t_5$, $t_6$ and $t_7$ as shown in FIG. 5 correspond to those labelled with the same reference numerals in FIG. 4. While time points of $t_4$ and $t_8'$ as shown in FIGS. 5 and 6 correspond to time points of $t_4$ and $t_8$ as shown in FIG. 4 the former may deviate from the latter and therefore have been primed.

The operation of the arrangement as shown in FIG. 3 will now be described with reference to FIG. 5 starting with time point of $t_7$ at which the thyristor 44 is turned off. It is to be noted that, for AC power converted to DC power, the current flowing through the curcuit 90 is inverted in polarity from that in the DC-to-AC conversion mode of operation. Thus that current is designated by $I_F'$. Therefore at time point of $t_7$ the primary transformer windings 72 and 73 have flowing therethrough a current with a polarity such that the end terminal 78 is positive with respect to the end terminal 74. Since the control signal S52 for the thyristor 52 rises to its high level at time point of $t_7$, the thyristor 52 is turned on. The turn-on of the thyristor 52 completes the first closed current loop I as above described including junction 34-end terminal 74-primary windings 72, 73-end terminal 78-diode 58, This completion of the first closed current loop I causes substantially a shortcircuit of the primary windings 72 and 73 between the end terminals 74 and 76 which gives substantially the same result as the result that the secondary windings 82 between the secondary terminals 84 and 86 is substantially shortcircuited. Thus during a time interval $(t_7 - t_8')$ a current from the AC source 106 flows through the energy storage circuit 90 with a magnitude thereof immediately before time point of $t_7'$ given as the initial condition. This results in the storage of electrical energy in the energy storage circuit 90 during that time interval $(t_7 - t_8')$.

At time point of $t_8'$ the current $I_F'$ is inverted in polarity to turn the thyristor 52 off. Therefore the first closed current loop I is broken to disappear. While all the remaining thyristors are in their OFF state at that time point of $t_8'$ a supply circuit to the primary winding 72 is formed including end terminal 74-diode 56-junction 34-commutation circuit 60-junction 32-terminal 22-battery 10-terminal 24-impedance element 80-center tap 76.

While the commutation capacitor 64 is charged with such a polarity that the $a$ terminal is positive with respect to the $b$ terminal the current $I_F'$ is inverted in polarity at time point of $t_8'$ to cause a corresponding current to flow through that supply circuit resulting in the supply of the current to the battery 10. The current supplied to the battery 10 is caused from the delivery of the electrical energy stored in the circuit 90 during the time interval $(t_7' - t_8')$.

Then a control signal S42 for the thyristor 42 rises to its high level at time point of $t_1$ to turn it on. Thereby the capacitor 62 previously charged with the steady state polarity or with the $a$ terminal positive with respect to the $b$ terminal discharges through a current path including capacitor 64-$a$ terminal-reactor 62-junction 32-thyristor 42-junction 36-diode 56-$b$ terminal.

As a result, the capacitor 64 is charged with the reverse polarity.

At that time the thyristor 42 is turned on and a current on the primary side of the transformer 70 flows so as to render the end terminal 74 positive with respect to the center tap 76. That is, the current from the end terminal 74 flows through a current path including diode 46-junction 32-terminal 22-battery 10-terminal 24-impedance element 80-center tap 76.

Therefore the current continues to be supplied to the battery 10 with the polarity rendering the terminal 22 positive with respect to the terminal 24.

At time point of $t_2$ the control signal S42 for the thyristor 42 decays to its null level and instead a control signal S52 for the thyristor 52 rises to its high level. Thus the thyristor 42 is turned off while the thyristor 52 is turned on. As a result, the charge with the inverse polarity on the capacitor 64 discharges through the thyristor 52, the diode 46 and the reactor 62, to turn the thyristor 42 off. Due to this discharge, the capacitor 64 is again charged with the steady state polarity.

Also during a time interval $(t_2 - t_3)$ the current rendering the end terminal 74 positive with respect to the center tap 76 continues to flow into the battery 10 through the diode 46. This current also results from the electrical energy stored in the energy storage circuit 90 during a time interval $(t_7' - t_8')$. Consequently, the electrical energy stored in the circuit 90 during the time interval $(t_7 - t_8')$ is delivered to the battery 10 during a time interval $(t_8' - t_3)$. As a current continues to flow through the end terminal 74 so as to render it positive with respect to the center tap 76 during a time interval $(t_2 - t_3)$, the thyristor 52 causes the capacitor 64 to charge with a steady state polarity immediately followed by its turn-off. While FIG. 5 illustrates the thyristor 52 in its ON state during the time interval $(t_2 - t_3)$ only for purposes of illustration the thyristor 52 has an extremely short ON period.

Then a control signal S54 for the thyristor 54 is put at its high level at time point of $t_3$. This causes the thyristor 54 to be immediately turned on because of the presence of the current polarity rendering the terminal 74 positive with respect to the terminal 78 at that time point. Thus the turn-on of the thyristor 54 completes the second closed current loop II as above described including junction 34-thyristor 54-junction 38-end terminal 78-primary windings 73, 72-end terminal 74-diode 56.

Therefore as above described, the completion of the second closed current loop II gives the same result as the result that the primary windings 72 and 73 and hence the secondary winding 82 are shortcircuited. This permits electrical energy to be again stored in the energy storage circuit 90. The energy continues to be stored on the circuit 90 until the current $I_F'$ is inverted polarity at time point of $t_4'$.

During a time interval $(t_4' - t_5)$ the electrical energy stored in the energy storage circuit 90 causes a flow of current through a current path including end terminal 78-diode 58-junction 34-commutation circuit 60-junction 32-terminal 22-battery 10-terminal 24-impedance element 80-center tap 76.

During a time interval between time point of $t_5$ at which the thyristor 44 is turned on and time point of $t_7$ at which the diode 48 is turned off, a current from the primary winding 13 flows through a current path including end terminal 78-junction 38-diode 48-junction 32-terminal 22-battery 10-terminal 24-impedance element 80-center tap 76.

That is, the current is supplied to the battery 10 with a polarity rendering the terminal 22 positive with respect to the terminal 24. That current is caused from the electrical energy stored on a energy storage circuit 90 during the time interval $(t_3 - t_4')$. It is to be noted that during the time interval $(t_8' - t_3)$ and also during the time interval $(t_4' - t_7)$ the direct current supplied to the battery 10 is rectified so as to have a polarity such that the terminal 22 is positive with respect to the terminal 24. This rectification is effectively accomplished by the diodes 46 and 48.

In the AC-to-DC conversion mode of operation as above described in conjunction with FIG. 5, the electrical energy storage circuit 90 within the pause period and particularly during both the time interval $(t_3 - t_4')$ and the time interval $(t_7 - t_8')$ results in the delivery thereof to the side of the DC load during the conduction period $\theta$ as well as during the time intervals $(t_4' - t_5)$ and $(t_8' - t_7)$ within the pause period $\phi$.

From the comparison of FIG. 6 with FIG. 5(a) it is seen that the current $I_F$ flowing through the energy storage circuit 90 during the conduction period $\theta$ is much different between FIG. 5 depicting the impedance element 80 having a direct current of 10 amperes flowing therethrough and FIG. 6 depicting the same element having a direct current of substantially null magnitude flowing therethrough. In FIG. 6, time points of $t_1, t_3, t_4', t_5, t_7$ and $t_8'$ are the same as the corresponding ones shown in FIG. 5.

In FIG. 6, it is seen that the current $I_F'$ is inverted in polarity at time point of $t_{10}$ in the conduction period $\theta$ between time points of $t_1$ and $t_3$ and also at time point of $t_{11}$ in the conduction period $\theta$ between time points of $t_5$ and $t_7$. During a time interval $(t_{10} - t_3)$ the electrical energy delivered to the DC terminals 22 and 25 resulting from that stored in the energy storage circuit 90 is fed back to the side of the AC power source through the thyristor 42 in its ON state at that time. This is true in the case of a time interval $(t_{11} - t_7)$ excepting that the feedback is accomplished through the thyristor 44 maintained conductive at that time. The feedback as above described is effected particularly when the energy stored in the energy storage circuit 90 during the time intervals $(t_3 - t_4')$ and $(t_7 - t_8')$ in the pause period is high than that required for the DC load connected across the DC terminals 22 and 24, that is to say, when the DC load is low. In the arrangement of FIG. 3 a current path through which feedback is effected can be positively formed. Therefore by taking advantage of the feedback of electrical energy, a variation in voltage across the terminals 22 and 24 can be reduced while the efficiency of AC-to-DC conversion can be improved.

By changing the pause period $\phi$ or the time intervals $(t_3 - t_5)$ and $(t_3 - t_1)$, the voltage across the DC terminals 22 and 24 may be varied as shown in FIG. 7. In FIG. 7 the voltage across the DC terminals in volts is plotted on the ordinate against a pause angle in degrees corresponding to the pause period on the abscissa with the energy storage circuit 90 having the same circuit parameters as those above described in conjunction with FIGS. 5 and 6. Also the AC terminals 102 and 104 have connected thereacross a commercial AC source of 60 Hertz and 100 volts.

Curve A has been obtained for the DC load maintained null by opening the DC terminals 22 and 24 and curve B has been obtained for a direct current of 10 amperes flowing through the DC load. Similarly, curve C depicts a direct current of 20 amperes flowing through the DC load. In any event it will readily be understood that an increase in the pause angle causes a high voltage to be developed across the terminals 22 and 24. FIG. 7 shows that the DC power across the terminals 22 and 24 can be controlled by changing the pause angle or period. This is important in controlling the DC power provided in the AC-to-DC conversion mode of operation.

The pause angle $\phi$ can be adjusted as follows: If it is desired to decrease the pause angle $\phi$ then the control signals for the thyristors 52 and 54 may be delayed in their rise time point $t_b$ within the pause period $\phi$. Regarding the time interval $(t_3 - t_4')$ for example, FIG. 5(d) shows the control signal S54 for the thyristor 54 rising at a time point $t_b$ substantially coinciding with the time point of $t_3$ at which the conduction period $\theta$ terminates. That rise time point $t_b$ may lag behind the time point of $t_3$ to decrease the pause period. In the latter event the electrical energy from the energy storage circuit 90 continues to be delivered to the terminals 22 and 24 through the diode 46 until the control signal for the thyristor 54 rises to its high level. Simultaneously with this, the thyristor 54 is turned on to perform the function of substantially shortcircuiting the primary windings 72 and 73 and therefore the secondary winding 82. This results in an increase in the conduction period $\theta$ with a decrease in the pause period $\phi$. This is applicable to the control signal S52 for the thyristor 52 developed in the time interval $(t_7 - t_8')$.

On the contrary, an increase in the pause angle $\phi$ may be accomplished by causing time points of $t_2$ or $t_a$ and $t_7$ to approach time points of $t_1$ and $t_5$ respectively (see FIG. 5) thereby to advance the rise time point $t_a$ of the control signal for each thyristor 54 and 52. The conduction period $\theta$ is shortened by advancing the time point $t_2$ or $t_a$ while the pause angle $\phi$ is made large by advancing the time point $t_b$.

FIG. 8 shows a voltage $V_{82}$ across the secondary transformer winding 82 and a corresponding current $I_F'$ with the control signals S42 and S44 for the thyristors 42 and 44 always maintained at their null level and with the control signals S52 and S54 for the thyristors 52 and 54 identical to those described in conjunction with FIG. 5. The voltage and current were measured with the terminals 22 and 24 having connected thereacross a high capacitance capacitor rather than the battery 10 for convenience's sake. As in FIG. 5, the conduction period terminates at each of time points of $t_3$ and $t_7$ and the current is reversed in polarity at time points of $t_4'$ and $t_8'$. It is noted that FIG. 8 does not indicate time points corresponding to time points of $t_1$, $t_2$, $t_3$ and $t_6$ shown in FIG. 5 because the thyristors 42 and 44 remain always in their OFF state. Instead new time points of $t_{12}$ and $t_{13}$ are shown in FIG. 8 as being located between time points of $t_8'$ and $t_3$ and between time points of $t_4'$ and $t_7$ respectively. At these time points of $t_{12}$ and $t_{13}$ the current $I_F'$ reaches its zero point.

Since the thyristors 42 and 44 remain always in their OFF state as above described, there is performed no operation of feeding the delivered energy back to the side of the AC source such as above described in conjunction with the time intervals $(t_{10} - t_3)$ and $(t_{11} - t_7)$ shown in FIG. 5. Thus a DC voltage could be provided across the terminals 22 and 24 the magnitude of which was higher by the factor of 1.7 as compared with FIG. 6. The mode of operation as shown in FIG. 8 is effective for increasing the range within which the DC voltage is controllable.

In FIG. 8 it is noted that at time points of $t_{12}$ and $t_{13}$ the capacitor across the terminals 22 and 24 has been charged resulting in the application of a reverse bias across the diodes 46 and 48 while none of the thyristors 52 and 54 is fired at those time points. This ensures that no closed circuit is completed on the primary side of the transformer 70. Therefore the intact voltage corresponding to a no-load voltage is developed on the secondary side of the transformer 70 resulting in the occurrence of the phenomenon that the voltage $V_{82}$ is abruptly decreased at time points of $t_{13}$ and $t_{12}$ where the current $I_F'$ reaches its zero point as above described.

In the AC-to-DC conversion mode of operation, the detecting line 140 is operative to detect a voltage across the DC terminal 22 and 24 to control circuit 130 thereby to render the detected voltage equal to for example, a predetermined magnitude. Also the detecting line 144 is operative to sense a current flowing into the load connected across the terminals 22 and 24 to control the control circuit 130 thereby to render the sensed current equal to, for example, a predetermined magnitude.

By putting the AC-to-DC and DC-to-AC conversion modes of operation together, it will be appreciated that in the DC-to-AC conversion mode the operation is performed about the conduction period $\theta$ while in the AC-to-DC conversion mode the operation is performed about the pause period $\phi$. This means that in the DC-to-AC conversion mode of operation the control is effected giving priority to the conduction period $\theta$ while in the AC-to-DC conversion mode of operation the control is effected giving priority to the pause period $\phi$.

Figure 9:
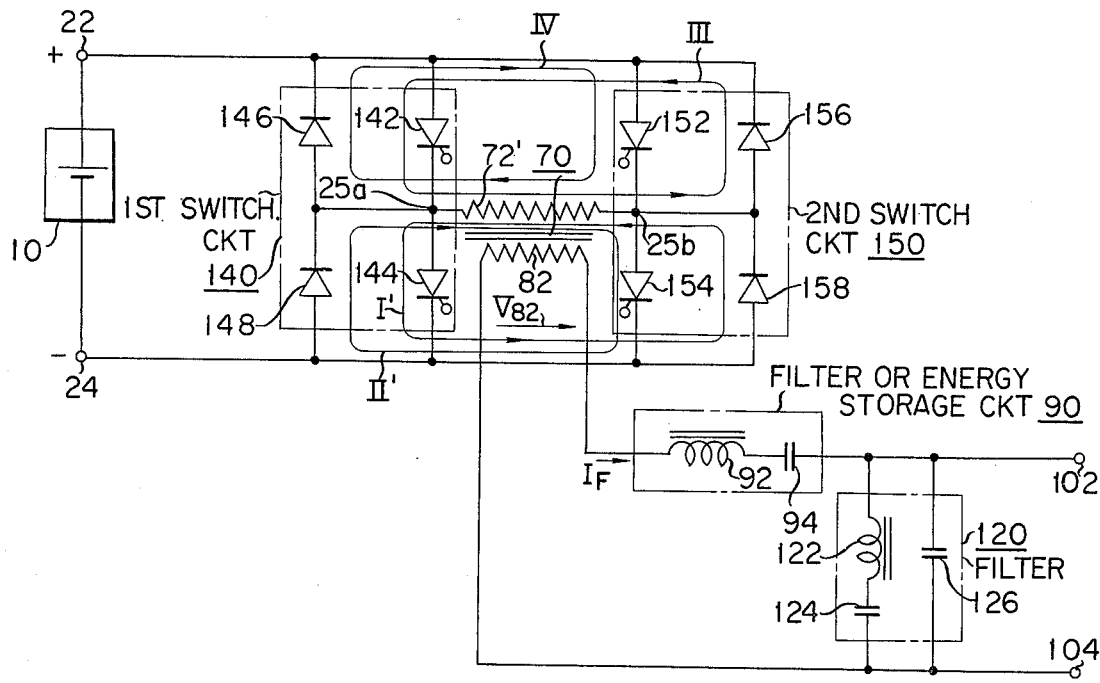
FIG. 9 is a fragmental wiring diagram of another form of the power conversion circuit used with the power conversion system of the present invention.

Referring now to FIG. 9, there is illustrated another power conversion circuit constructed in accordance with the principles of the present invention. The arrangement illustrated in substantially identical to that shown in FIG. 3 except for the circuit configuration disposed on the primary side of the transformer. More specifically, a DC load 10 also shown as a battery is connected across a parallel combination of two switching circuit generally designated by the reference numerals 140 and 150 respectively through a pair of DC terminals 22 and 24. The switching circuit 140 includes a pair of switching elements 142 and 144, in this case thyristors serially interconnected, and one semiconductor diode 46 or 148 connected in anti-parallel circuit relationship across each thyristor 142 or 144. A current from the battery 10 can flow through the terminal 22 into the serially connected thyristors 142 and 144 in their conducting state. Similarly the switching circuit 150 includes a pair of switching elements 152 and 154 shown as being thyristors and a pair of semiconductor diodes 156 and 158 interconnected in the same manner as the corresponding components forming the switching circuit 140.

Then the transformer 70 includes a single primary winding 72' connected across the junction 25a of the components 142, 144, 146 and 148 and the junction 25a of the components 152, 154, 156 and 158.

In other respects, the arrangement is identical to that shown in FIG. 3 and like reference numerals designate the components identical to those shown in FIG. 3. It is to be noted in FIG. 9 that the commutation and control circuits such as the circuits 60 and 130 shown in FIG.

3, for the thyristors 142, 144, 152 and 154 are omitted only for proposes of illustration.

The operation of the arrangement will now be described with reference to FIG. 10. Thick solid lines shown in FIGS. 10(a) through 10(d) designates time intervals during which the corresponding thyristors are or can to be in their ON state with a control signal therefor having its high level. FIG. 10(e) shows a voltage $V_{82}$ developed across the secondary winding 82 of the transformer 70 as a solid line and the current $I_F$ flowing though the filter circuit 90 as a dotted line in the AC-to-DC conversion mode of operation. Also time points of $t_1$, $t_3$, $t_4'$, $t_7$ and $t_8'$ correspond to time points as shown in FIG. 5 having identical suffixes thereto.

From FIGS. 10(a) through 10(d) it is seen that the thyristors 142 and 144 alternate in operation with respect to each other as do the thyristors 152 and 154. That is, each of the thyristors 142 and 152 is in its conducting state while the mating thyristor 144 or 154 is in its non-conducting state and vice versa. Also the thyristor 154 lags in operation behind the thyristor 142 by the period $\phi$ while the thyristor 152 lags in operation behind the thyristor 142 by the period $\phi$.

it is assumed that the arrangement of FIG. 9 is operated in the DC-to-AC conversion mode. During a time interval $(t_1 - t_3)$ the thyristors 142 and 154 are in their ON state to permit a current from the DC source 10 to flow through a current path including terminal 2-thyristor 142-junction 25a-primary winding 72'-junction 25a-thyristor 154-terminal 24.

Thus a voltage is applied across the primary winding 72' with a predetermined polarity. During the next succeeding time interval $(t_3 - t_5)$ the thyristors 144 and 154 can to be turned on but the voltage from the DC source 10 is not applied across the primary winding 72'. Under these circumstances, a first closed current loop I' is completed traced from the junction 25a through the thyristor 144, the diode 158, the junction 25b, the primary winding 72' and thence back to the junction 25a. Alternatively a second closed current loop II' may be completed traced from the junction 25b through the thyristor 154, the diode 148, the junction 25a the primary winding 72' and thence back to the junction 25b. This permits a flow of a primary current corresponding to a reactive component of a current $I_F$ flowing through the filter circuit 90.

During a time interval $(t_5 - t_7)$ the thyristers 144 and 152 are in their ON state and the DC source 10 applies across the primary winding 72' a voltage with the polarity reversed from that above described through a current path including terminal 22-thyristor 152-junction 25b-primary winding 72'-junction 136-thyristor 144-terminal 24.

During the next succeeding time interval $(t_7 - t_1)$ the thyristors 142 and 152 can to be turned on but the voltage from the DC source 10 is not applied across the primary winding 72'. Under these circumstances, a third closed current loop III is completed traced from the junction 25a through the primary winding 72', the junction 25b, the diode 156, the thyristor 142, and thence back to the junction 25a. Alternatively a fourth closed circulation loop IV may be completed traced from the junction 25b through the primary winding 72' the junction 136, the diode 146, the thyristor 152 and thence back to the junction 25b. This permits a flow of primary current corresponding to a reactive component of the current $I_F'$.

With the arrangement of FIG. 9 operated in the AC-to-DC conversion mode, it is required to cause a flow of primary current having the polarity rendering the junction 25b positive with respect to the junction 25a in accordance with a secondary current $I_F$ within a time interval $(t_7 - t_1)$ and until time point of $t_8'$ at which the current $I_F$ is reversed in polarity. That current will flow through the third closed current loop III as above described. Therefore during this time interval the third current loop III substantially shortcircuits the primary winding 72' and hence the secondary winding 82. As a result, electrical energy is stored in the energy storage circuit 90 as during the time interval $(t_7 - t_8)$ shown in FIG. 5. This stored energy from the storage circuit 90 is delivered with the polarity rendering the junction 25a positive with respect to the junction 25b, through a current path including junction 25a-diode 146-terminal 22-battery 10-terminal 24-diode 158-junction 25b-primary winding 72', during a time interval $(t_1 - t_3)$. This results, in the supply to the battery 10.

Also within a time interval $(t_3 - t_5)$ it is required to cause a flow of primary current with the polarity rendering the junction 25a positive with respect to the junction 138 in accordance with the secondary current $I_F$ and until time point of $t_4'$ at which the current $I_F$ is reversed in polarity. That primary current will flow through the first closed current loop I' as above described. During this time interval $(t_3 - t_4')$ the first closed current loop I' substantially shortcircuits the primary winding 72' and therefore the secondary winding 82 of the transformer 70. Thus as during the time $(t_3 - t_4')$ shown in FIG. 5, electrical energy is stored in the energy storage circuit 90. During a time interval $(t_5 - t_7)$ this stored energy from the storage circuit 90 is delivered with a polarity rendering the junction 25b positive with respect to the junction 25a through a current path including junction 25b-diode 156-terminal 22-battery 10-terminal 24-diode 148-junction 25a-primary winding 72'.

This results in the supply to the battery 10.

Figure 10:
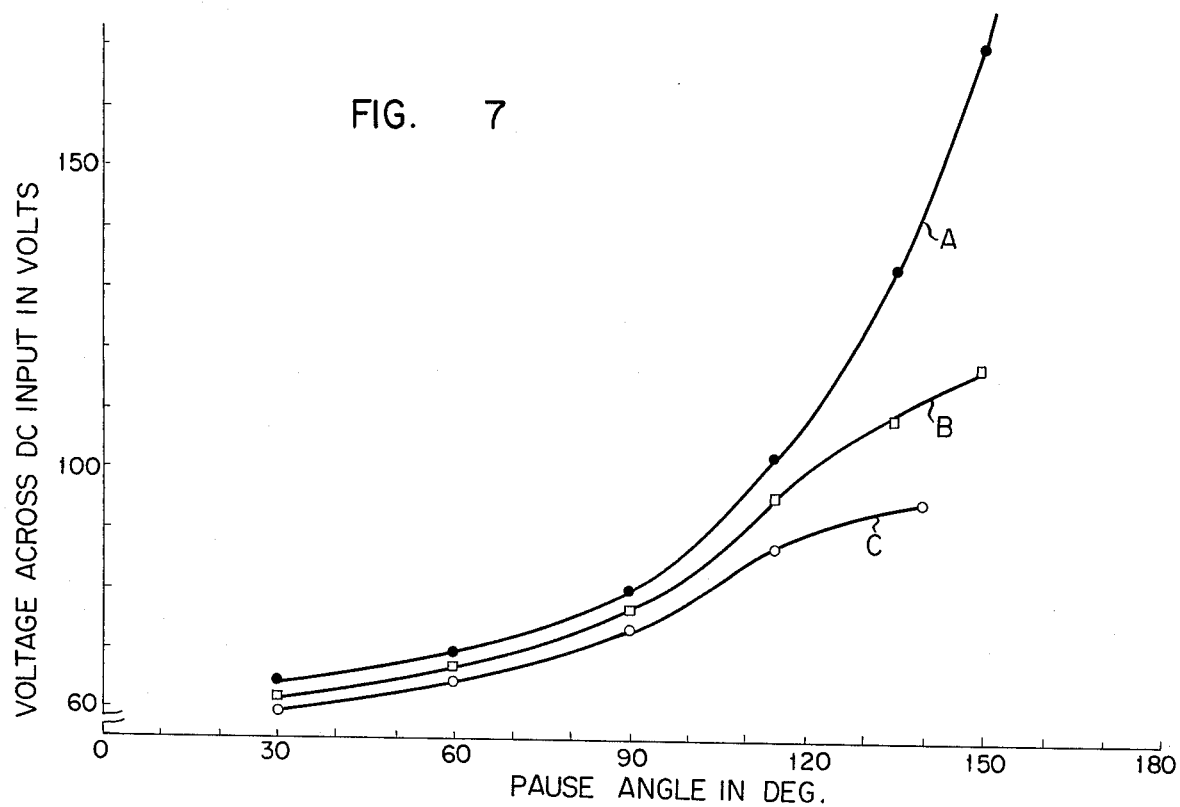
FIG. 10 is a graph useful in explaining the operation of the arrangement shown in FIG. 9.

According to the first mode of operation as shown in FIG. 10, electrical energy can not be supplied to the battery 10 even during a time interval $(t_4' - t_5)$ or $(t_8' - t_1)$ as in the mode of operation as shown in FIG. 5. This is because, in FIG. 10, the thyristor 154 is put in its ON state to complete the second closed current loop II' during the time interval $(t_4' - t_5)$ and because the thyristor 152 is also put in its ON state to complete the fourth closed current loop III during the time interval $(t_8' - t_1)$.

Figure 11:
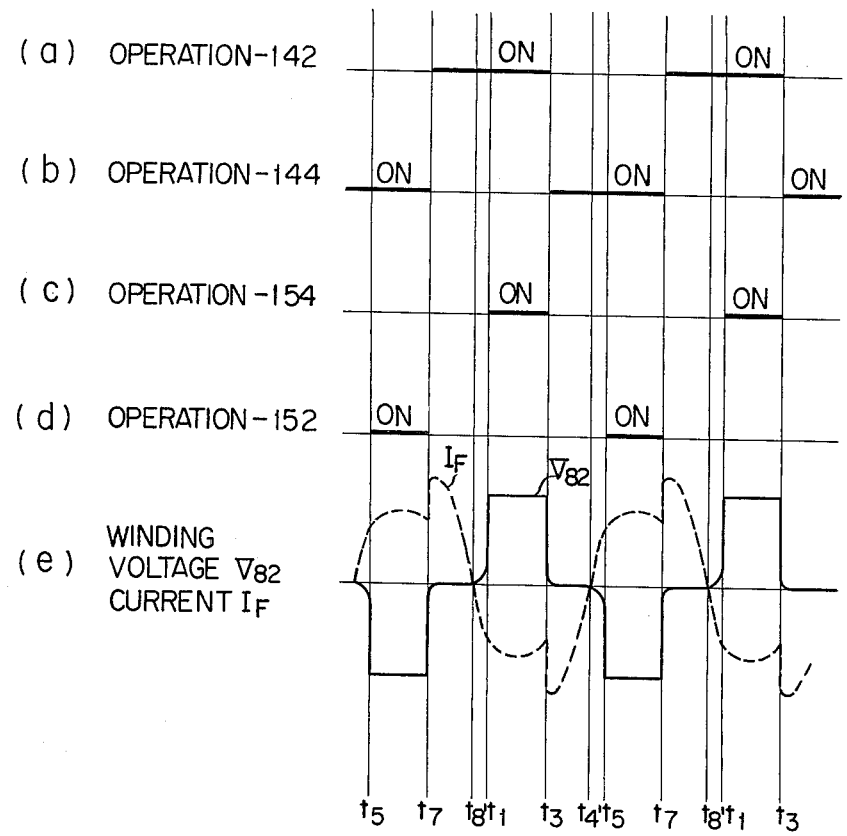
FIG. 11 is a graph similar to FIG. 11 but illustrating an operation of the arrangement of FIG. 9 somewhat different from that shown in FIG. 10.

However, by operating the arrangement of FIG. 9 in a second mode of as shown in FIG. 11, it is possible to supply electrical energy to the battery even during these time intervals. By comparing FIG. 11 with FIG. 10 it will be seen that in FIG. 11 the operation of the thyristors 152 and 154 is particularly modified to halve their and ON period as composed with FIG. 10. More specifically, the ON period of those thyristors is caused to terminate early so that the thyristors 152 and 154 are triggered to their OFF state simultaneously with the turn-off of the thyristors 142 and 144 respectively. This measure prevents the completion of the second and fourth closed current loops during the time intervals $(t_4' - t_5)$ and $(t_8' - t_1)$ respectively. Therefore the energy from the storage circuit 90 can to be delivered to the battery 10 during those time intervals.

In FIG. 11 it is also seen that the thyristors 142 and 144 can have an ON period equal in duration to the sum of the pause and conduction periods $\phi$ and $\theta$ respectively while the thyristors 152 and 154 have the ON period equal in duration to the conduction period $\theta$. However it is to be understood that the thyristors 142 and 152 may have the longer ON period while the thyristors 144 and 154 may have the shorter ON period and vice versa.

Figure 12:
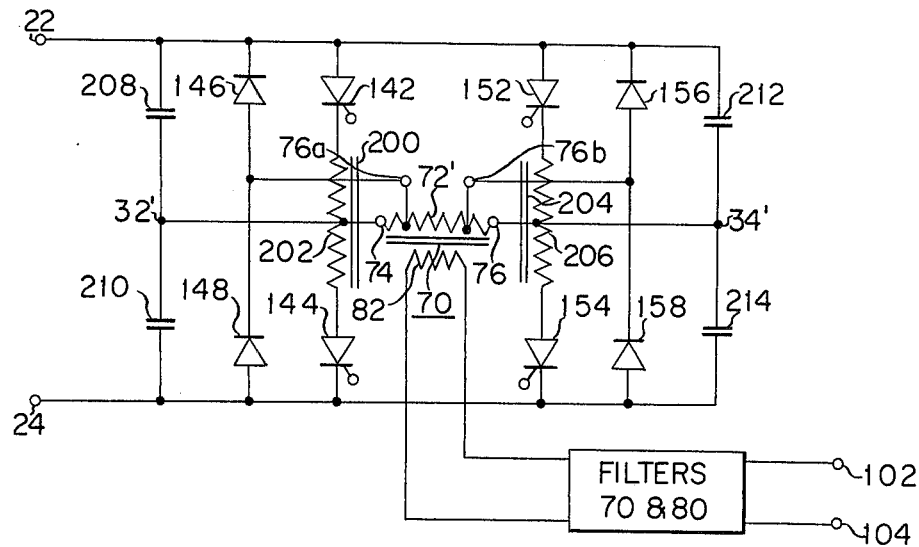
FIG. 12 is a wiring diagram of a commutation circuit connected to the arrangement shown in FIG. 9.
Figure 13:
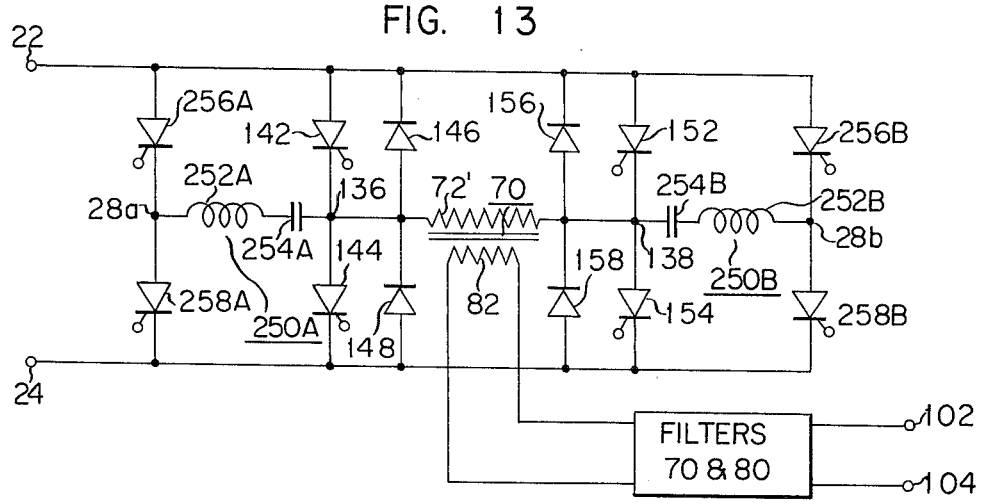
FIG. 13 is a diagram similar to FIG. 12 but illustrating a modification of the arrangement shown in FIG. 12.

While FIG. 9 shows no commutation circuit for the thyristors 142, 144, 152 and 154 various types of the commutation circuit are well known in the art. In FIGS. 12 and 13 wherein like reference numerals designate the components identical to those shown in FIG. 9, two different forms of the commutation circuit are illustrated by way of example.

In FIG. 12, a commutation reactor 200 has a winding with a center tap 202 thereon connected across the cathode and anode electrodes respectively of the thyristors 142 and 144 and another commutation reactor 204 has a winding with a center tap 206 connected across the cathode and anode electrodes respectively of the thyristor 152 and 154. The center taps 202 and 206 are connected to end terminals 74 and 78 of the primary transformer winding 72' respectively.

Then connected across the DC terminals 22 and 24 are a pair of serially connected commutation capacitors 208 and 210 and another pair of serially connected commutation capacitors 212 and 214. The junction 32' of the capacitors 208 and 210 is connected to the center tap 202 on the reactor 200 winding and the junction 34' of the capacitors 212 and 214 is connected to the center tap 206 on the reactor 204 winding. Also the junction of the diodes 146 and 148 is connected to an intermediate tap 76a on the primary transformer winding 72' and the junction of the diode 156 and 158 is connected to another intermediate tap 76b on the primary winding 72'.

In FIG. 13, a commutation circuit generally designated by the reference numeral 250A is connected across a series combination of thyristors 142 and 144, while another commutation circuit generally designated by the reference numeral 250B is connected across a series combination of thyristors 152 and 145. The commutation circuit 250A includes a commutation reactor 252A serially connected to a commutation capacitor 254A subsequently connected to the junction 136 of the thyristors 142 and 144. The commutation circuit further includes an auxiliary thyristor 256A for commutation having an anode electrode connected to the DC terminal 22 and a cathode electrode connected to an anode electrode of another auxiliary thyristor 258A for commutation to which the reactor 252A is connected at a junction 28a. The auxiliary thyristor 258A has a cathode electrode connected to the DC terminal 24. The commutation circuit 250B is identical to the commutation circuit 250A and therefore the components thereof corresponding to those included in the circuit 250A are designated by like reference numerals with the suffix B rather than A. For example, the reference numeral 256B designates a thyristor corresponding to the thyristor 256A. The thyristor 256B is connected to the thyristor 258B through the junction 28b thereof.

The commutation circuit as shown in FIG. 12 is described in B, D, Bedford and R. G. Hoft book entitled "Principles of Inverter Circuits" pp. 190–207, 1974, John Wiley and Sons Inc. New York N.Y. and that shown in FIG. 13 is described in the same book, pp. 165–183. Therefore the commutation operation performed by each of those commutation circuits need not be further described herein.

Figure 14:
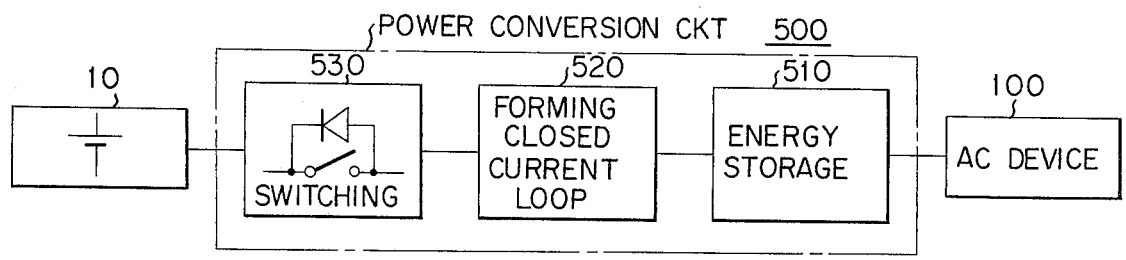
FIG. 14 is a block diagram of the basic form of a power conversion system constructed in accordance with the principles of the present invention.

The power conversion circuits as above described can be in block diagram, shown in FIG. 14. In FIG. 14 the power conversion circuit is shown in block 500 including a block 510 connected on one side to block 100. Block 510 represents an energy storage circuit corresponding to the filter circuit 90 as shown in FIGS. 3 and 9 and block 100 represents the AC apparatus as shown in FIG. 3. Block 510 is connected on the other side to block 520 which is in turn connected via block 530 to block 10 representing the DC load or battery 10 as shown in FIG. 3. Block 520 represents a circuit for forming the closed current loops I and II as shown in FIG. 3 or the closed current loops I', II', III and IV as shown in FIG. 9 independent of the DC source 10 or not included in the latter.

Block 530 is shown as including a switching element 532 and a semiconductor diode 534 and performs the function different from the AC-to-DC to the AC-to-DC conversion. In the DC-to-AC conversion mode of operation the switching element 532 is effectively operative to alternately provide the pause and conduction periods as above described and corresponds to the switching elements 42 and 44 as shown in FIG. 3 and also to the switching elements 142, 144, 152 and 154 as shown in FIG. 9. The diode in block 530 performs the rectifying operation in the AC-to-DC conversion mode of operation and corresponds to the diodes 46 and 48 as shown in FIG. 3 and also to the diodes 146, 148, 156 and 158 as shown in FIG. 9.

Figure 15:
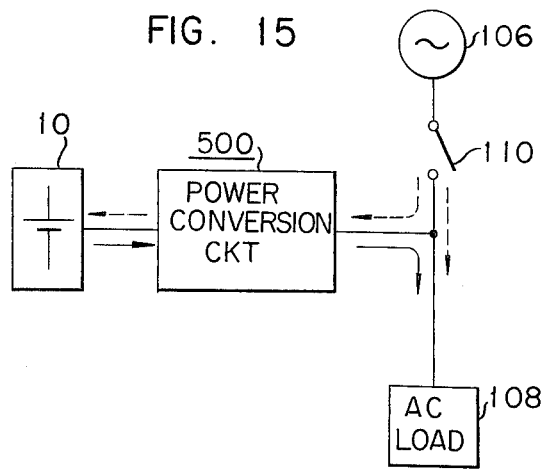
FIG. 15 is a block diagram of uninterruptible source of electric power embodying the principles of the present invention.

FIG. 15 shows a standby power source apparatus or an uninterruptible power source embodying the principles of the present invention. In the arrangement illustrated block 500 is identical to block 500 as shown in FIG. 14 and connected between a DC source 10 shown as a battery and an AC load 104 connected to a commercial AC source 106 through a switch 110. With the AC source 106 in order, the switch 110 is closed to supply an AC power to the AC load 108 from the AC source 106, as shown by the straight dotted line arrow in FIG. 14. Simultaneously the power conversion circuit 500 performs the AC-to-DC conversion operation to charge the battery 10, as also shown by the curved dotted line arrow in FIG. 15. Upon the occurrence of a fault in the AC source 106, the switch 110 can be opened. This opening of the switch 110 causes the power conversion circuit 500 to switch from the AC-to-DC to the DC-to-AC conversion mode of operation. This results in the supply of AC power to the AC load 108 as shown by the solid line arrow in FIG. 15. During this transition of the AC-to-DC to the DC-to-AC conversion mode of operation, it is to be noted that the AC power can continue to be supplied to the AC load with no outage.

The arrangement of FIG. 15 is characterized by the use of a single power conversion circuit 500, with the result that the entire apparatus can be manufactured at one half the cost or less as compared with the conventional apparatus such as shown in FIGS. 1 and 2. In addition, the power conversion circuit 500 can switch from the DC-to-AC to the AC-to-DC conversion mode of operation and vice versa without the necessity of effecting any special change in the circuit configuration. This facilitates the handling of the apparatus and also is effective for eliminating outage during the transition of the AC-to-DC to the DC-to-AC conversion mode of operation and vice versa.

From the foregoing it will be appreciated that, according to the present invention, the power conversion circuit able to perform the DC-to-AC conversion operation can be used to perform the AC-to-DC conversion operation without any change in the electrical connection of the circuit involved. That is, the present invention provides a combined AC-to-DC and DC-to-AC conversion apparatus. The AC-to-DC conversion can be increased in efficiency by storing electrical energy during one time interval and releasing the stored energy during the next succeeding time interval. Moreover the released energy can be controlled by controlling the time interval of storage of the electrical energy. Since the present power conversion circuit can be selectively used as an inverter and a converter as above described, inexpensive uninterruptible and standby power apparatus can be provided.

While the present invention has been illustrated and described in conjunction with a few preferred embodiments thereof it is to be understood that numerous changes and modifications may be resorted to without departing from the spirit and scope of the present invention.

What we claim is:

1. A power conversion system comprising, in combination, first terminal means; second terminal means; energy storing circuit means connected to said first terminal means; power conversion circuit means connected between said second terminal means and said energy storing circuit means including a first switching circuit for electrically coupling said first terminal means and said second terminal means to each other through said energy storing circuit means and a second switching circuit for forming a closed current loop, said closed current loop being electrically coupled to said energy storing circuit means for causing the electrical energy to be stored in said energy storing circuit means; means for applying AC power across said first terminal means; and means for applying DC power across said second terminal means, said power conversion circuit means further including a control circuit for responding to the application of said AC power across said first terminal means to alternately control said first and second switching circuits so that a first time period is formed during which said switching circuit forms said closed current loop to store electrical energy in said energy storing circuit means and a second time period is formed during which said closed current loop is broken to produce a DC voltage across said second terminal means in accordance with the electrical energy stored in said energy storing circuit means, said power conversion circuit means also responding to the application of said DC power across said second terminal means to produce an AC voltage across said first terminal means on the basis of the operation of said first switching circuit.

2. A power conversion system as claimed in claim 1 wherein said power conversion circuit means includes a first switching element and a second switching element, at least said first switching element being operative to control said first switching circuit and at least said second switching element being operative to control said second switching circuit.

3. A power conversion system as claimed in claim 2 wherein said first switching element is operative to control said first switching circuit and said second switching element is operative to control said second switching circuit.

4. A power conversion control system as claimed in claim 2 wherein each of said first and second switching elements is operative to control said first and second switching circuits.

5. A power conversion system as claimed in claim 2 wherein a semiconductor diode is connected in parallel to said switching element included in said power conversion circuit means so that, with the AC power applied across said first terminal means, said diode rectifies the electrical energy stored in said energy storing circuit means to produce said DC voltage across said second terminal means during said second time period.

6. A power conversion system as claimed in claim 1 wherein said power conversion circuit means includes transformer means having a first winding and a second winding inductively coupled to each other and wherein said energy storing circuit means is connected to said first winding while said first switching circuit and said second switching circuit are connected to second winding.

7. A power conversion system as claimed in claim 6 wherein said energy storing circuit means includes filter means serially connected to said first winding, and said filter means is operative to store the electrical energy during said first time period when said first terminal means have the AC power applied thereacross.

8. A power conversion system as claimed in claim 6 wherein said first switching circuit of said power conversion means connected between said second winding and said second terminal means, and said second switching circuit of said conversion circuit means is connected across said second winding.

9. A power conversion system as claimed in claim 8 wherein said first switching circuit includes a first switching element connected between one end of said second winding and said second terminal means and a second switching element connected between the other end of said second winding and said second terminal means, and wherein said second switching circuit includes a third switching element and a fourth switching element serially interconnected across said second winding.

10. A power conversion system as claimed in claim 9 wherein each of said first, second, third and fourth switching elements includes a thyristor connected in anti-parallel circuit relationship across a semiconductor diode, and wherein said first and second switching elements are interconnected so that the associated thyristors are the same in the forward direction as said second terminal means while said third and fourth switching elements are interconnected so that the associated thyristors are reversed in the forward direction from each other.

11. A power conversion system as claimed in claim 10 wherein a commutation circuit is connected between the junction of said third and fourth switching elements and said second terminal means.

12. A power conversion system as claimed in claim 6 wherein said first switching circuit includes a first circuit portion connected between one end of said second transformer winding and said second terminal means, and a second circuit portion connected between the other end of said second transformer winding and said second terminal means whereby said closed current loop is formed to bridge said first and second circuit portions and said second winding.

13. A power conversion system as claimed in claim 12 wherein said first circuit portion includes a first switching element connected between one end of said second transformer winding and one terminal of said second terminal means and a second switching element connected between the one end of said second transformer winding and the other terminal of said terminal means while said second circuit portion includes a third switching element connected between the other end of said second transformer winding and the one terminal of said terminal means and a fourth switching element connected between the other end of said second transformer means and the other terminal of said second terminal means, the arrangement being such that, with the DC voltage applied across said second terminal means, said first and third switching elements are put in their ON state to cause a current to flow from the one to the other end of said second winding and said second and fourth switching elements are put in their ON state to cause a current to flow from the other to the one end of said second winding.

14. A power conversion system as claimed in claim 13 wherein each of said first, second, third and fourth switching elements includes a thyristor connected in anti-parallel circuit relationship across a semiconductor diode.

* * * * *